Nov. 12, 1940.  E. G. GRIFFITH  2,221,676

FRUIT WASHING APPARATUS

Filed Oct. 12, 1937  2 Sheets-Sheet 1

INVENTOR.
Earl G. Griffith
BY
ATTORNEY

Patented Nov. 12, 1940

2,221,676

UNITED STATES PATENT OFFICE 2,221,676

FRUIT WASHING APPARATUS

Earl G. Griffith, Los Angeles, Calif.

Application October 12, 1937, Serial No. 168,604

3 Claims. (Cl. 146—202)

My invention relates particularly to an apparatus for washing or brushing fruit, such as oranges, lemons and the like, and has among its salient objects to provide improved mechanism for feeding the fruit forwardly from one brush to another in a uniform manner, with means for assuring the movement of the fruit forwardly without its remaining in the trough between two brushes and revolving therein.

Another object of my invention is to provide an apparatus in which alternate brushes are supported on movable supports which are balanced by each other, whereby said alternate brushes can be moved up and down to facilitate the movement of the fruit forwardly from one trough to another.

Another object of my invention is to provide an apparatus of the character referred to in which the movable supports for the brushes are mounted in a vertically inclined position in order to further facilitate the forward movement of the fruit from one trough to another.

Another object of my invention is to provide a cross rod extending across the apparatus, lengthwise in each trough formed by two adjacent brushes to engage with the fruit as it is fed from one trough to another, said rod operating to prevent the fruit from revolving by action of the revolving brushes and thus facilitating the movement of the fruit forwardly.

Other objects and advantages of my invention will appear from the following more detailed description of one practical embodiment thereof, taken with the accompanying two sheets of drawings, in which—

Figures 2, 3:
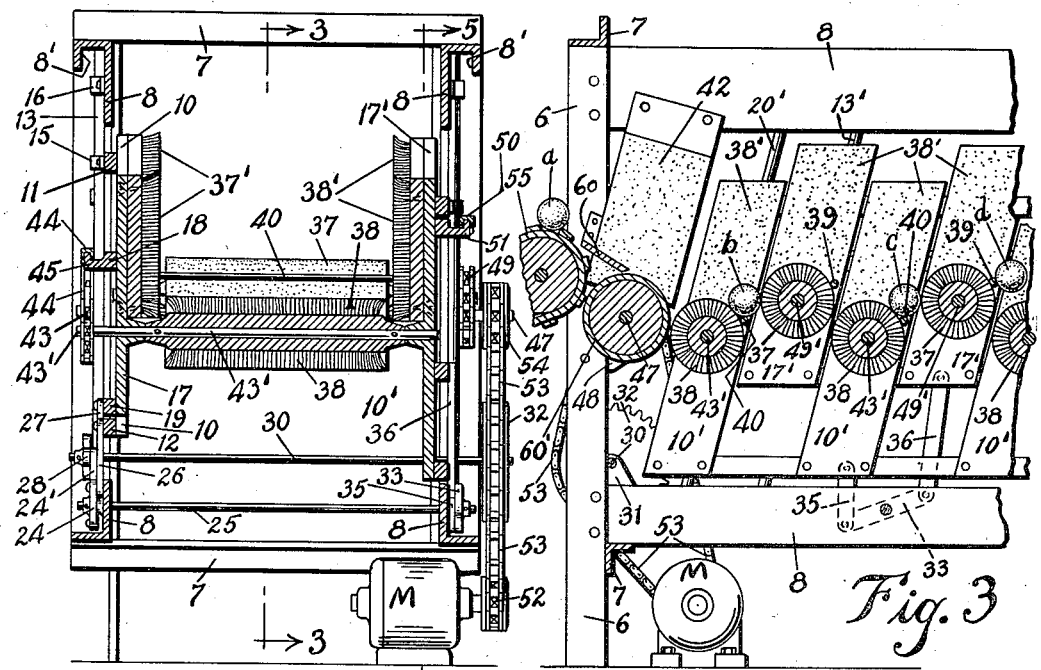
Figure 2 is a vertical, transverse sectional view thereof, taken on line 2—2 of Fig. 1, said line being on a slight incline.
Figure 3 is a partial, vertical sectional view taken through the middle of the apparatus on line 3—3 of Fig. 2.

Referring now in detail to the drawings, a general rectangular frame structure, or open box-like form is provided, having the corner angle members 6, 6, connected by transverse angle members 7, 7, and longitudinal side members 8, 8, said upper side members 8, 8, having channel portions 8', 8', as seen in Fig. 2.

Mounted at opposite sides of said frame structure, are movable supporting panel-like members for supporting the brushes, hereinafter referred to.

Figure 1:
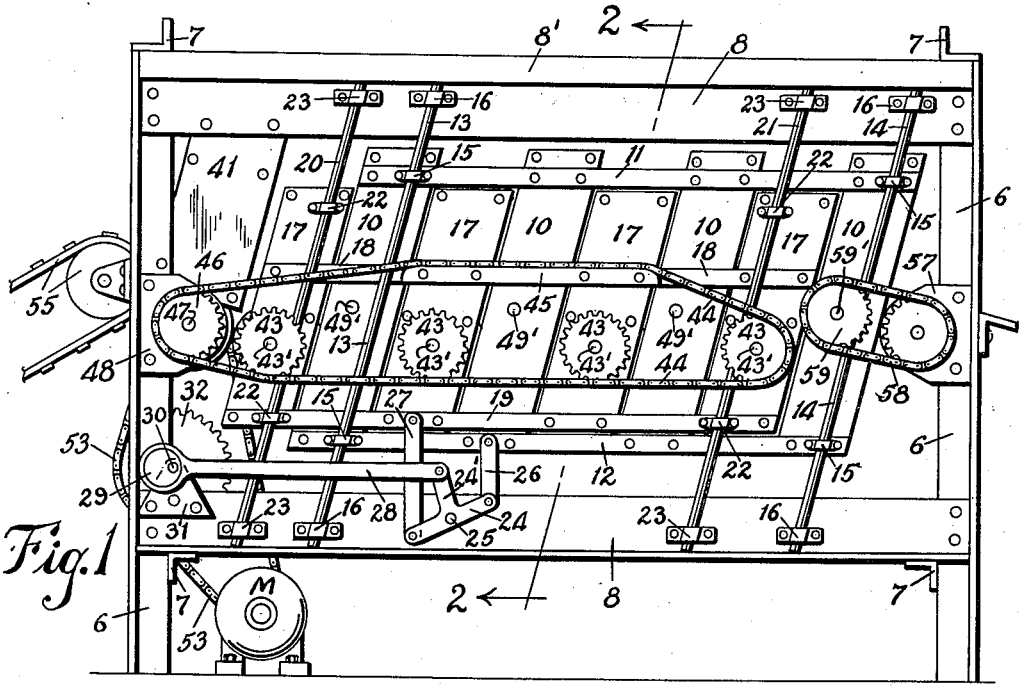
Figure 1 is a side elevation of an apparatus embodying my invention.

In Fig. 1, a side elevation, panels designated 10, 10, are secured to a connecting bar 11, at the top, and a connecting bar 12 at their lower ends. Said connecting bars 11 and 12, at their opposite ends are slidably secured to vertically inclined rods, 13 and 14, by suitable brackets, all designated 15, said rods being secured to the side members 8, 8, by brackets 16. Thus said members, 10, 10, can be raised and lowered in a manner again referred to.

Alternating with the members 10, 10, are panels 17, 17, connected by connecting bar 18, intermediate their ends, and at their lower ends connected by bar 19, said connecting bars 18 and 19 being secured slidably to rods 20 and 21 by brackets 22, and to the top and bottom side members 8, by brackets 23. Thus said members 17, 17, alternating with members 10, 10, can also be moved up and down.

On the opposite side of said apparatus, corresponding supporting members are designated 10', 10', and 17', 17', and are supported in the same manner in brackets similar to the brackets 16, and 23, and on similar rods, designated 13', 14', and 20' and 21', whereby corresponding supporting members 10 and 10' on opposite sides of said frame structure and members 17 and 17' on opposite sides of said frame can all be raised and lowered. Attention is called to the fact that a short member 17 on one side and a long member 10' on the opposite side are opposite each other and are movable on the rods 20 and 20', as will be understood by comparison of Figs. 1 and 4.

As one means for alternately moving said supporting members 10, 10', and 17, 17', their lower connecting bars 12 and 19, are connected with a rocker arm 24, pivotally supported on shaft 25 and secured thereto, by means of two links, 26 and 27, respectively, and of different lengths, as shown. Said rocker arm 24 has an operating arm 24' connected with a pitman rod 28, which at its other end is connected with an eccentric 29, on a shaft 30, supported in a bracket 31, at each side of the frame structure, as seen in Fig. 2, and provided with a sprocket wheel 32.

On the opposite side of the frame structure is mounted another rocker arm 33, secured to the same shaft 25 in the frame members 8, and having two connecting links 35 and 36 connected with alternate supporting members 10' and 17', the pivotal support for the two rocker arms 24 and 33, being the same shaft 25.

An important feature of this invention is the fact that the supporting members 10 and 10', and 17 and 17' at the opposite sides of the frame structure, are so alternated and supported for movement by said rocker arms 24 and 33, that one set balances the other set so that their movements up and down alternately is made much easier.

Rotatably mounted between the inner faces of supporting members 10 and 17', are brushes, all designated 37, and rotatably mounted between the inner faces of supporting members 17 and 10' are brushes, all designated 38, and these brushes are moved up and down with their respective supporting members and alternately.

Also mounted between said supporting members, across the inside of said frame structure, are cross rods, as 39 between the members 10 and 17', and 40 between the members 17 and 10'. The rods are fixed relative to the brushes and function to engage with the fruit to prevent the fruit from rotating with the brush and to facilitate the transfer of the fruit forwardly from one trough (formed between adjacent brushes) to another.

The inner faces of the supporting members 10, 10', and 17, 17', above the brushes 37 and 38, are also provided with stationary brushes, as 37' and 38', secured to said supporting members and moving therewith. These are seen in Fig. 2, and are indicated by the dotted faces of said supporting members in Figs. 3 and 4. As the fruit is moved forwardly upon the rotating brushes 37 and 38, it also comes in contact with the brushes 37' and 38'.

At the feed end of the structure I have shown two short, fixed members, as 41 and 42, also having brushes on their faces the same as 37' and 38'.

As a means for driving said rotatable brushes 37 and 38, on the outer faces of the supporting members 17, are mounted sprocket wheels, as 43, 43, with a sprocket chain 44 running under the same, the upper lap of said chain being carried by a straight rack or bracket 45, secured to the connecting bar 18. Said sprocket chain 44 runs over a driving sprocket 46, on a shaft 47, in supporting brackets 48, 48, secured to the opposite sides of the front end of said frame structure. The shafts of the sprockets 43, are designated 43' and constitute the shafts of the brushes 38.

On the opposite side of the frame structure the supporting members 17', 17', are provided with sprocket wheels, as 49, 49, with a sprocket chain 50 running under the same, with its upper lap carried by a straight rack or bracket 51, as at the opposite side of the structure. This sprocket chain arrangement permits said supporting members to be alternately raised and lowered, as before described.

The mechanism is driven from a motor M, with small sprocket 52, driving a sprocket chain 53, which drives the sprocket 32, to operate the pitman rod 28, and also drives a sprocket 54, on the outer end of the shaft 47, as indicated in Figs. 1 and 2.

Figure 4:
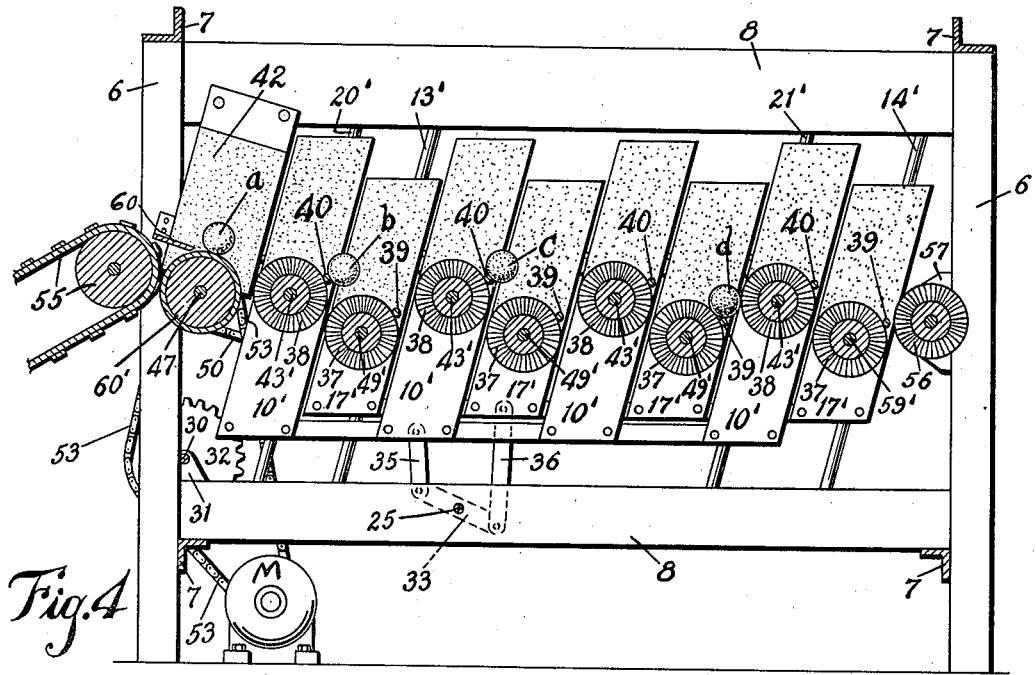
Figure 4 is a vertical sectional view taken on the line 3—3, the same as Fig. 3, but with the movable supports for the brushes shifted to alternate positions.
Figure 5:
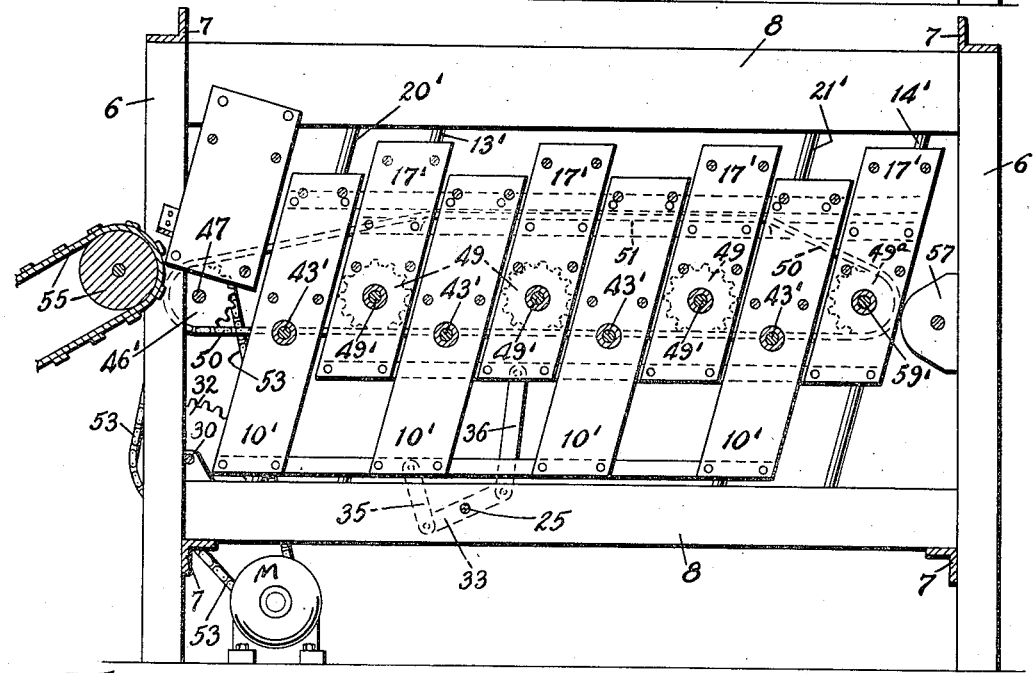
Figure 5 is an inside view taken on the line 5—5 of Fig. 2.

The fruit is fed to the apparatus by an endless conveyor of any suitable type, designated as a whole 55, on the front end of the structure, and designed to deliver the fruit over a bridge member 60, on to a plain roller 60', on the shaft 47, and from which roller 60' the fruit is delivered to the first brush 38, in the position seen in Fig. 3. When the supporting member 10' and brush 38 and the cross rod 40, and the orange, as seen in Fig. 3 are all raised together to the position as seen in Fig. 4, said cross rod operates to cause the orange $b$ to move forwardly and down upon brush 37, on supporting member 17' and to rod 39. It will be seen that oranges $b$, $c$, and $d$, are all being thus moved because these supporting members 10', 10' are raised and the oranges are just ready to fall to the brushes 37 below.

At the discharge end of the structure is mounted a brush 56, in brackets 57, 57, at opposite sides of the frame, and this brush is rotated on its fixed axis by a short sprocket chain 58, driven from a sprocket 59, on shaft 59', which also carries a brush 37. Said sprocket 59 and shaft 59' are driven at the opposite side by the sprocket chain 50 running over a sprocket 49$^a$.

Thus I have provided an apparatus for receiving and brushing fruit which has movable brushes to cause said fruit to move forwardly from the trough between two brushes to the trough next in order. I have provided means whereby the movement of one set of brushes is balanced by the alternate set of brushes, thus making it easy to move said brushes alternately up and down. I have provided in combination with the revolving brushes fixed cross rods adjacent said brushes to prevent the fruit from revolving in the trough and for facilitating the movement of the fruit forwardly as the brush is raised.

I do not limit my invention, however, to the details of construction and arrangement here shown for descriptive purposes, except as I may be limited by the hereto appended claims.

I claim:

1. In a fruit brushing apparatus, a supporting frame, a series of cylindrical rotatable brushes arranged in substantially parallel relatively close position to form a substantially horizontal bed, over which fruit is fed transversely of the axes of the brushes, means for driving the brushes in the same direction to effect feeding of the fruit over said bed, means movably supporting alternate of said brushes for bodily parallel movement up and down in substantially rectilinear paths inclined to the vertical, the upward inclined movement of said brushes being generally toward the direction of travel of the fruit over said bed to transfer the fruit in the valley between two adjacent brushes to the next succeeding valley between two adjacent brushes, and means for effecting said bodily movement of said alternate brushes for a predetermined distance less than that allowing the fruit to discharge from the bed between adjacent brushes.

2. In a fruit brushing apparatus, two sets of substantially cylindrical rotatable brushes, the brushes of one set alternating with the brushes of the other set to form a bed extending substantially horizontally and being sufficiently close to prevent at all times the fruit discharging from between adjacent brushes, means for driving the brushes in the same direction for effecting travel of the fruit over said bed, means movably supporting said brushes for bodily movement up and down in substantially rectilinear parallel paths inclined to the vertical and generally toward the direction of travel of the fruit over said bed, the brushes of each set being connected to be moved together as a unit, and means for actuating said movable supporting means of each set of brushes in opposite directions for a predetermined distance to alternately dispose the upper bed forming portions of adjacent brushes out of alignment with each other, during the operation of the apparatus, to transfer fruit in a valley between two adjacent brushes to the valley next succeeding between two adjacent brushes.

3. In a fruit brushing apparatus, a supporting frame structure, a plurality of cylindrical rotatable brushes arranged in relatively close relation to form a horizontal bed, brush bearing supports one at each end of said brushes and movably mounted for substantially parallel up and down movement, guide means for directing the movement of said brush supports in a vertically inclined path with the upward movement being toward the direction of travel of the fruit over said bed, means operatively connected with alternate brush supports for effecting said up and down movement of the same and of their brushes, and means operatively connected with the other brush supports for effecting said up and down movement thereof and of their brushes synchronously with and in a direction opposite the movement of said first or alternate brush supports, whereby to alternately dispose the upper bed forming portions of adjacent brushes out of alignment with each other to transfer fruit forwardly from between one pair of brushes over one of said pair to a point between the latter and the next succeeding brush where the operation is repeated, and means for driving the brushes in the same direction for effecting the travel of the fruit over said bed.

EARL G. GRIFFITH.